United States Patent [19]

Bergkamp et al.

[11] Patent Number: 5,161,353
[45] Date of Patent: Nov. 10, 1992

[54] SLOPE MOWER WITH IMPROVED BLADE HOUSING FLOATATION

[75] Inventors: Alan R. Bergkamp, Murdock; Terrance L. Schrag, Kingman, both of Kans.

[73] Assignee: DewEze Manufacturing, Inc., Harper, Kans.

[21] Appl. No.: 748,250

[22] Filed: Aug. 21, 1991

[51] Int. Cl.$^5$ .............. A01D 34/66; A01D 34/86
[52] U.S. Cl. .................................... 56/6; 56/13.6; 56/14.7; 56/209; 280/112.2
[58] Field of Search ............. 56/6, 13.6, 14.7, 17.2, 56/209, DIG. 10, DIG. 22; 280/112.2, 772, 755

[56] References Cited

U.S. PATENT DOCUMENTS

| | | |
|---|---|---|
| 2,688,833 | 9/1954 | Weiss et al. . |
| 2,780,903 | 2/1957 | Kroll et al. ............................ 56/209 |
| 2,801,511 | 8/1957 | Vogelaar ............................... 56/209 |
| 2,872,200 | 2/1959 | Kroll . |
| 2,982,080 | 5/1961 | Martin ...................................... 56/6 |
| 3,080,696 | 3/1963 | Wood . |
| 3,115,739 | 12/1963 | Thoen et al. ............................ 56/6 |
| 3,118,266 | 1/1964 | Colburn . |
| 3,122,379 | 2/1964 | Allinquant . |
| 3,136,106 | 6/1964 | Joslin . |
| 3,157,014 | 11/1964 | Bottenberg .............................. 56/6 |
| 3,166,880 | 1/1965 | Robinson ................................. 56/6 |
| 3,177,638 | 4/1965 | Johnson ................................... 56/7 |
| 3,255,577 | 6/1966 | Colburn . |
| 3,269,685 | 8/1966 | Wallace . |
| 3,402,536 | 9/1968 | Hale et al. . |
| 3,408,798 | 11/1968 | Hale et al. . |
| 3,418,790 | 12/1968 | Whitfield et al. ....................... 56/6 |
| 3,539,197 | 11/1970 | Remaud . |
| 3,608,284 | 9/1971 | Erdman .................................... 56/6 |
| 3,630,010 | 12/1971 | Rester ................................. 56/13.5 |
| 3,712,404 | 1/1973 | Walquist . |
| 3,717,981 | 2/1973 | van Der Lely ......................... 56/6 |
| 3,777,459 | 12/1973 | Elliott .................................. 56/15.3 |
| 3,806,141 | 4/1974 | Louis et al. . |
| 3,821,990 | 7/1974 | Elmslie . |
| 3,953,040 | 4/1976 | Unruh et al. ...................... 56/209 X |
| 4,041,678 | 8/1977 | Chaney et al. ...................... 56/10.7 |
| 4,099,366 | 7/1978 | Peterson ............................... 56/13.6 |
| 4,313,295 | 2/1982 | Hansen et al. ....................... 56/15.8 |
| 4,316,356 | 2/1982 | Planeta ................................. 56/16.2 |
| 4,321,783 | 3/1982 | Kawasaki et al. ......... 56/DIG. 22 X |
| 4,416,109 | 11/1983 | Slagas ................................... 56/209 |
| 4,497,160 | 2/1985 | Millet et al. ............................. 56/6 |
| 4,577,455 | 3/1986 | Amano et al. ............ 56/DIG. 22 X |
| 4,809,489 | 3/1989 | Johansson ............................. 56/6 X |
| 4,869,054 | 9/1989 | Hostetler et al. ....................... 56/6 |
| 4,903,790 | 2/1990 | Horiike et al. ............... 280/112.2 X |
| 4,962,637 | 10/1990 | Giardina et al. ................ 56/14.7 X |
| 5,020,310 | 6/1991 | Oshima et al. ...................... 56/17.2 |

FOREIGN PATENT DOCUMENTS

| | | |
|---|---|---|
| 1921804 | 11/1969 | Fed. Rep. of Germany . |
| 647148 | 2/1979 | U.S.S.R. . |
| 783059 | 11/1980 | U.S.S.R. . |

Primary Examiner—George A. Suchfield
Attorney, Agent, or Firm—Litman, McMahon & Brown

[57] ABSTRACT

A mower vehicle includes a vehicle frame and single front and rear driven wheels. First and second blade housings are pivotally connected to each other along a longitudinal axis of the vehicle frame and are attached to first and second side frames, respectively. Each side frame is pivotally attached to the vehicle frame near the rear thereof with a hydraulically retractable and extendable cylinder assembly urging each side frame downward or upward in response to changes automatically sensed in the slope of the terrain. Ground engaging outrigger wheels attached to each side frame contact the terrain and the vehicle frame is thus maintained in a generally upright position. Two pivot point joints connect the blade housings and are located at approximately the same height as a plane containing the blades and the driven wheels include tires with a tread which is generally semi-circular in lateral cross-section with a center of the radii of the lowest part of the tread being located at approximately the average blade mowing height. Each blade housing is linked to a corresponding side frame by a mechanical linkage arm and a floatable connection that eliminate the need for rear caster wheels.

25 Claims, 3 Drawing Sheets

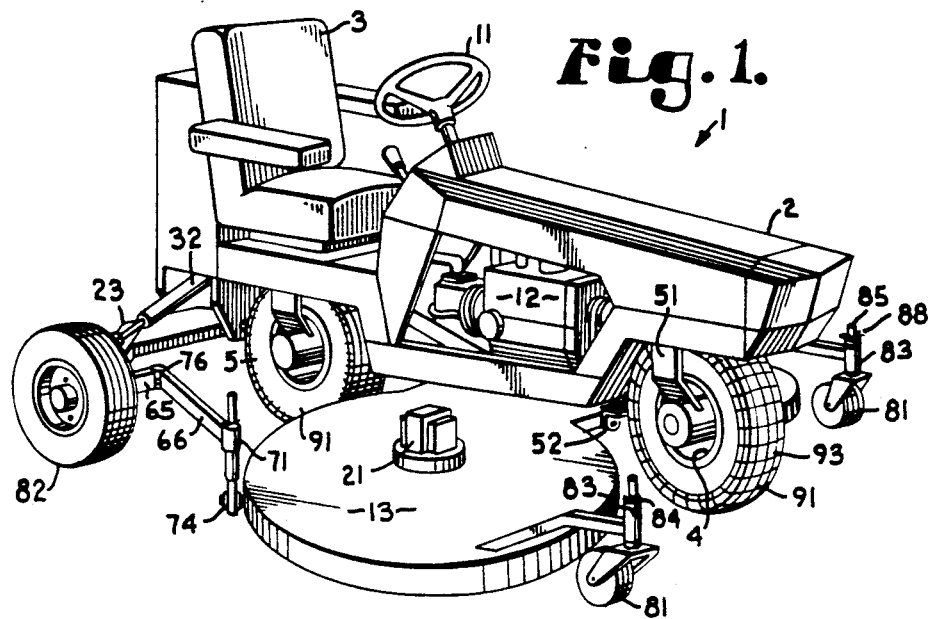

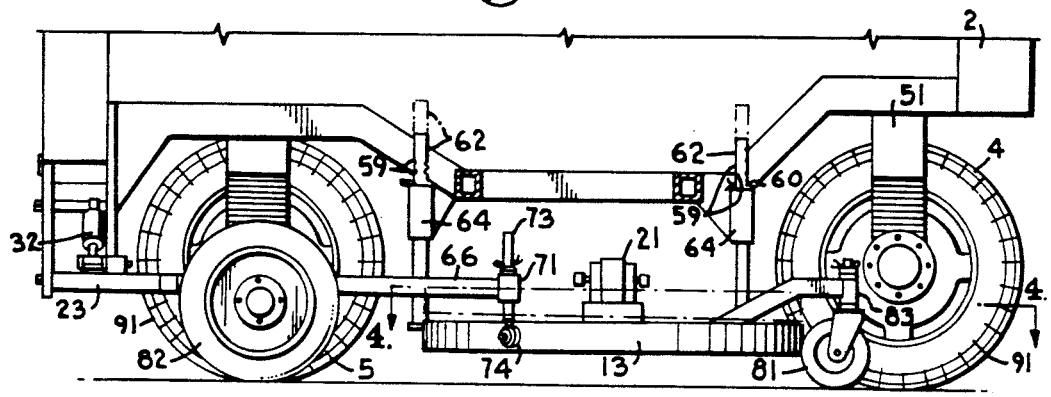
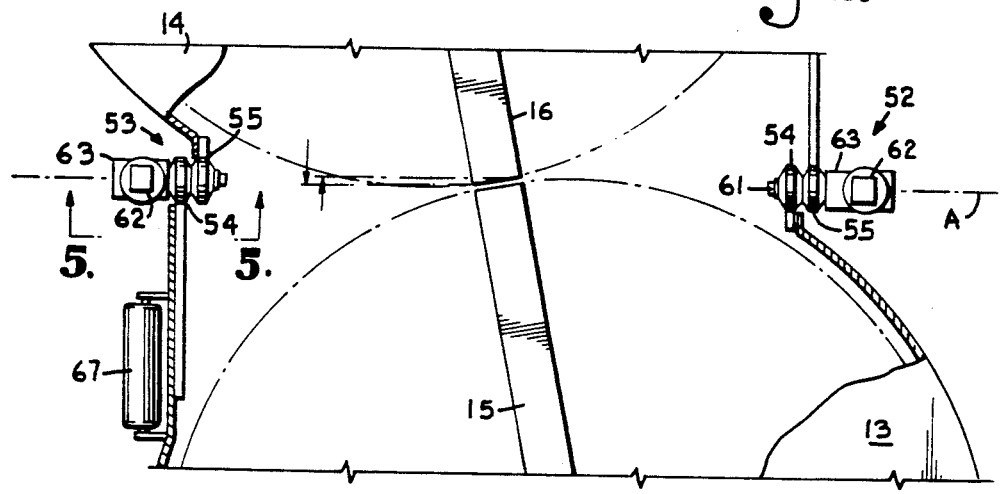
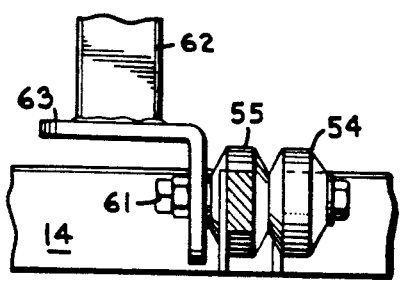
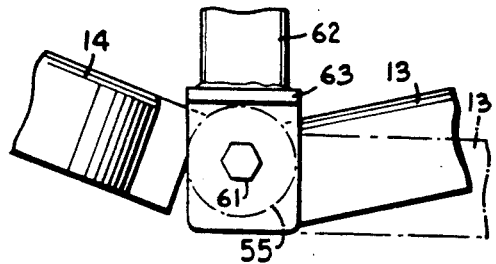

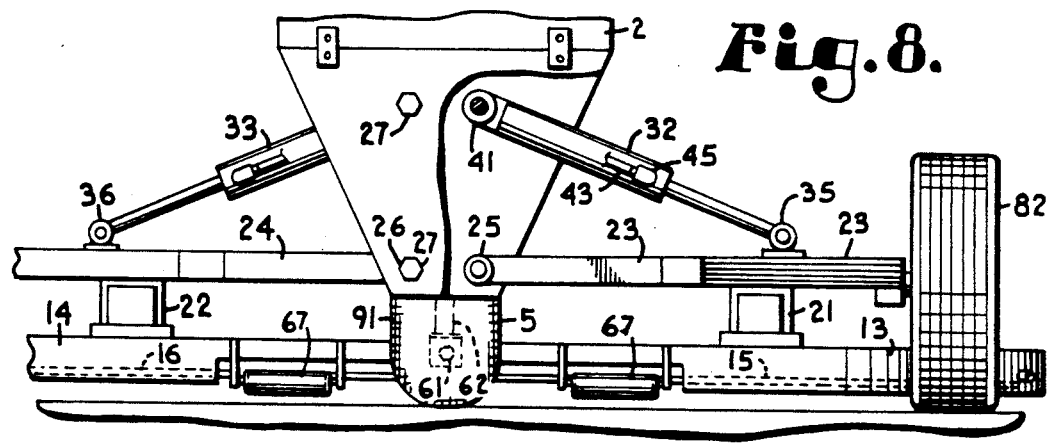
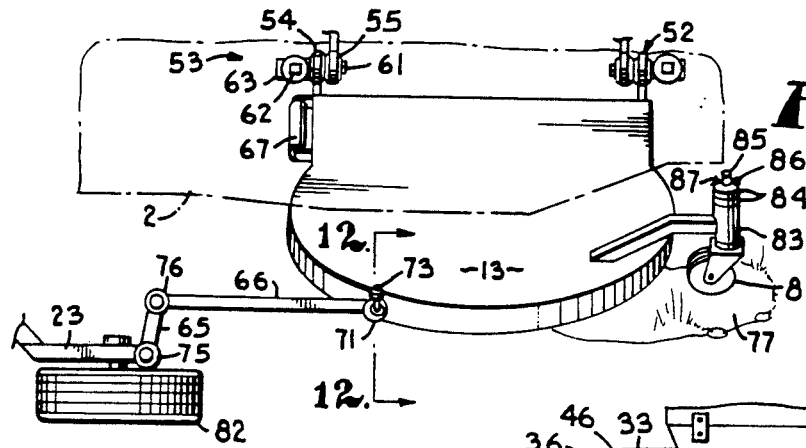
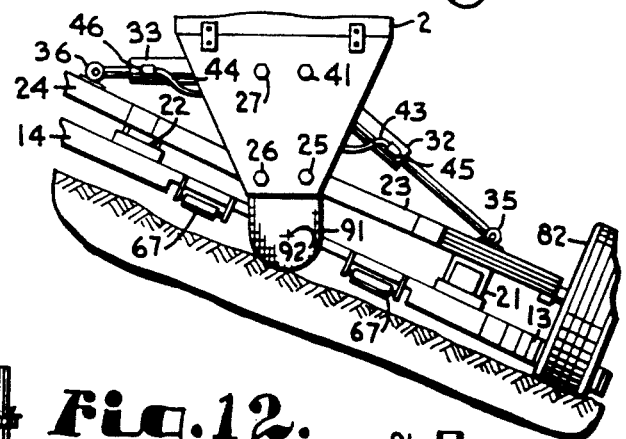
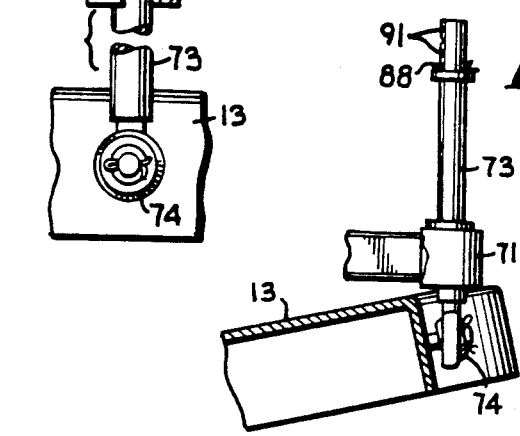
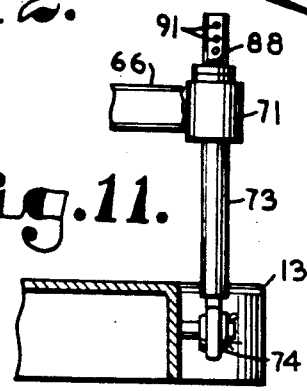

SLOPE MOWER WITH IMPROVED BLADE HOUSING FLOATATION

BACKGROUND OF THE INVENTION

This invention relates to mowing vehicles in general and particularly to such vehicles that are responsive to changes in terrain, such that the vehicle body is maintained in a generally vertical orientation.

Mowing vehicles, such as riding lawnmowers and tractors with mowing attachments, have long been used in mowing hillsides, particularly by highway maintenance personnel. Most of these vehicles do not provide means for adapting to changing terrain, such that when a vehicle is on a slope the frame tilts accordingly, which can result in the vehicle tipping over. Prior attempts to remedy this problem have included adapting existing mowing machines by providing mechanical actuation of a mower blade assembly to conform to the slope without significantly modifying the vehicle frame itself. Such modified mowers are limited in the degree of and types of slopes upon which they can be effectively and safely operated. Other devices have involved three- or four-wheeled vehicle frames with complex actuation of fixed deck blade housings.

These prior art devices have proven to be only somewhat effective in mowing slopes and have been very expensive, prohibiting many small operators and municipalities from using them.

U.S. Pat. No. 4,707,971 for a SLOPE MOWER and U.S. Pat. No. 4,869,054 for a SLOPE MOWER WITH SIDE FRAMES are directed to a mower designed to remain upright during use on a hill so the mower does not tip over and are incorporated herein by reference. These patents, assigned to the assignee of the present application, are directed to slope mowers which attempt to remedy the above problems. These mowers include a vehicle frame with single front and rear driven wheels. The vehicle frame is maintained in a generally upright or vertically aligned orientation by side-mounted hydraulic cylinder and piston rod arrangements which are actuated in response to a leveling system mounted on the vehicle frame. The leveling system senses changes in the attitude of the vehicle frame and selectively actuates the hydraulic cylinder arrangements to maintain the vehicle frame in an upright position. In U.S. Pat. No. 4,707,971, the hydraulic cylinder and piston rods are attached to mower blade housings with ground engaging caster wheels on either side of the vehicle frame, which housings are pivotally connected to each other along the center longitudinal axis of the vehicle frame. In U.S. Pat. No. 4,869,054, the hydraulic cylinder and piston rod arrangements are connected to a pair of side frames with ground engaging outrigger wheels which are hinged to the vehicle frame. A pair of mower housings are floatably mounted beneath the respective side frames and hinged to the vehicle frame and to each other.

While the above noted mower embodiments were a major improvement over the prior art and have been generally satisfactory in mowing slopes up to 30 degrees while maintaining the vehicle frame and rider in a generally upright position, a number of drawbacks remain. In both patents, the pair of mower deck housings are hinged to each other via a piano type hinge underneath the vehicle frame, which means that the hinge must be located such that the pivot point connecting the blade housings is considerably higher than a plane containing the mower blades. This means that, particularly when the mower is being operated on terrain which slopes away from the vehicle frame on either side, the mower blades will not be parallel to the surface of the terrain, resulting in uneven cutting. Furthermore, both patents teach the use of mower housings which are mounted side-by-side with synchronized blades of overlapping arcs. This requires a relatively complex synchronized mechanical drive linkage to drive the separate mower blades. Lastly, in the case of U.S. Pat. No. 4,869,054, the side frames are hinged to the vehicle frame at a forward location, which arrangement requires the floating mower decks to be equipped with supporting and/or adjusting caster wheels at both the front and the rear of each mower housing.

Thus, it is clear that a need exists for a slope mower which evenly mows terrain even when it slopes away from the vehicle frame on either side. Such a mower should have excellent traction on slopes up to 30 degrees and should be relatively inexpensive to own and operate.

SUMMARY OF THE INVENTION

A mower vehicle includes a vehicle frame with single front and rear driven wheels. First and second generally circular blade housings are pivotally connected to and laterally offset from each other along the center longitudinal axis of the vehicle frame. The blade housings are floatably attached to first and second outrigger wheel equipped side frames, respectively, with each side frame attached to the vehicle frame, near the rear thereof, at a hinge point. Each side frame has a hydraulically retractable and extendable cylinder assembly connected between it and the vehicle frame, which assemblies urge the side frames downward or upward in response to signals from a leveling sensor mounted on the vehicle frame. The leveling sensor senses changes in the slope of terrain over which the mower is moving and selectively controls the hydraulic cylinder assemblies to maintain the vehicle frame in a generally upright position through the side frame wheels which contact the terrain.

Two pivot points connect the blade housings near the front and the rear thereof. The pivot points are located at approximately the same height as a plane containing the blades. The driven wheels include tires with a tread having a lateral external cross-section that is generally semi-circularly curved having an axis of curvature of the tread located approximately coaxially with respect to the axis of rotation of the blade housings and at approximately the same height as the average blade mowing height. The blade housings are linked to the side frames via a mechanical linkage arrangement which eliminates the need for rear caster wheels on the blade housings and which provides a strong yet floatable connection.

OBJECTS AND ADVANTAGES OF THE INVENTION

The principal objects of the present invention are: to provide a mower vehicle for mowing sloping hillsides; to provide such a vehicle which has means to maintain a vehicle frame and, accordingly, the operator, in a generally vertical or upright orientation; to provide such a vehicle which includes a single front and a single rear drive wheel; to provide such a vehicle having means for driving each of the front and rear wheels; to provide such a vehicle in which the front and rear wheels are equipped with tires with a tread which is generally semi-circular in cross-section and which tread has an axis of curvature located at approximately the height of the average mowing height; to provide such a vehicle which has dual blade housings offset from each other along an axis extending longitudinally of the vehicle frame and being pivotally connected to each other so as to rotate about an axis generally coaxial with the axis of the curvature of the tires; to provide such a vehicle which includes outrigger wheel equipped side frames pivotally attached to opposite sides of the vehicle frame near the rear thereof; to provide such a vehicle which has a hydraulic cylinder and piston rod arrangement connected to each of the side frames to bias the side frames to maintain the vehicle frame in an upright orientation; to provide such a vehicle in which the mower housings are floatably attached to the respective side frames via a mechanical linkage arrangement which eliminates the need for rear caster wheels, yet strongly supports the rear of the housings; and to provide such a vehicle which is relatively simple to use, economical to manufacture, and particularly well adapted to the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a slope mower embodying the present invention.

FIG. 2 is an enlarged top plan view of the slope mower having a pair of blade housings and a pair of side frames.

FIG. 3 is an enlarged, fragmentary, side elevational view of the slope mower, illustrating a floatable attachment mechanism for attaching the right blade housing to the right side frames.

FIG. 4 is an enlarged, fragmentary, cross-sectional view of the mower blade housings, taken along line 4-4 of FIG. 3, with the housings shown partially cut away to illustrate the blade positions.

FIG. 5 is an enlarged, fragmentary, cross-sectional view of a pivot joint of one of the blade housing, taken along line 5—5 of FIG. 4.

FIG. 6 is an enlarged, fragmentary end view of the pivot joint of FIG. 5, with the blade housings pivoted relative to one another.

FIG. 7 is an enlarged, fragmentary, perspective view of the right blade housing and side frame, with the vehicle frame shown partially cut away to illustrate the blade housing pivot joints and with the blade housing floating relative to the side frame.

FIG. 8 is an enlarged, fragmentary, cross-sectional view of the slope mower, taken along line 8—8 of FIG. 2, with the vehicle frame shown partially cut away to illustrate the attachment of the right side frame to the vehicle frame.

FIG. 9 is a fragmentary, rear elevational view of the slope mower being operated on an approximately 30 degree slope.

FIG. 10 is an enlarged, fragmentary, side elevational view of an attachment linkage between the right side frame and the right blade housing, with a side frame linkage arm sleeve partially cut away to illustrate the spacing between a support rod and the sleeve.

FIG. 11 is an enlarged, fragmentary, cross-sectional view of the attachment linkage, taken along line 11—11 of FIG. 12 is an enlarged, fragmentary, cross-sectional view of the attachment linkage of FIG. 11, with the blade housing floating relative to the side frame as in FIG. 7.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, reference numeral 1 generally indicates a slope mower in accordance with the present invention. Referring to FIG. 1, this slope mower 1 includes a vehicle frame 2, an occupant seat 3, a front ground engaging drive wheel 4, a rear ground engaging drive wheel 5, and a steering wheel 11. A prime mover such as an internal combustion engine 12 is mounted on the vehicle frame 2 and is connected to at least one, and preferably both of the front and rear wheels 4 and 5, respectively, for propelling the slope mower 1 across the ground.

The slope mower 1 is equipped with a pair of generally circular blade housings 13 and 14, better illustrated in FIG. 2. The blade housings 13 and 14 are pivotally connected to each other along a center line longitudinal axis identified by the reference letter A of the vehicle frame 2 having a specific spacing above a horizontal surface as will be described below. As shown in FIG. 2, the right blade housing 13 is offset slightly forward of the left blade housing 14 along the longitudinal axis A. The blade housings 13 and 14 are each equipped with a single mower blade 15 and 16, respectively. The longitudinal offset positions of the blade housings 13 and 14 ensure that there is a slight overlap of the cutting arcs of the blades 15 and 16 along the center line of the longitudinal axis of the vehicle 2, as illustrated in FIG. 4. At the same time, this longitudinal offset ensures that the blades 15 and 16 never contact each other, thereby requiring no synchronization between blade driving units 21 and 22 as is required in many mowers having twin blades, thus greatly simplifying the mechanical drive mechanism for the blades 15 and 16. Since no such synchronization is required, independent hydraulically actuated motors, for example, can be used for the blade drive mechanisms 21 and 22.

A pair of side frames 23 and 24 are pivotally attached to the vehicle frame 2 at a respective pair of pivot joints 25 and 26, as best illustrated in FIG. 8. Each of the pivot joints 25 and 26 comprises a bolt 27 inserted through a corresponding bore in a rear housing 31 of the vehicle frame 2, and through a sleeve (not shown) formed in each of the side frames 23 and 24 and ensure that the side frames 23 and 24 are free to pivot relative to the vehicle frame 2 about the longitudinal axis A. A pair of hydraulically actuated piston and cylinder assemblies 32 and 33 are pivotally attached to the side frames 23 and 24, respectively, at pivot points 35 and 36. The other end of the hydraulic assemblies 33 and 34 is attached to the rear housing 31 at pivot points 41 and 42, each of which comprises a bolt and sleeve arrangement similar to that of pivot joints 25 and 26. The hydraulic piston and cylinder assemblies 32 and 33 are attached to hydraulic lines 43 and 44 via fittings 45 and 46, and are controlled by a level sensing and hydraulic control circuit as disclosed in U.S. Pat. No. 4,869,054 earlier incorporated by reference.

Briefly, the level sensing and hydraulic control circuit senses the slope of terrain over which the slope mower 1 is traveling by sensing the vertical orientation of the vehicle frame 2. The leveling system senses changes in the attitude or vertical orientation of the vehicle frame 2, and selectively extends or retracts one or both of the hydraulic piston and cylinder assemblies 32 and 33 to maintain the vehicle frame 2 in a generally upright position. This enables the side frames 23 and 24 and the blade housings 13 and 14 to maintain ground contact while the vehicle frame 2 (and the operator) remain vertically oriented.

The single front wheel 4 is connected to a front section of the vehicle frame 2 by a steering mechanism 51 and is driven by a hydraulic motor (not separately illustrated) connected to the engine 12 in the manner disclosed in detail in U.S. Pat. No. 4,869,054. Preferably, the rear wheel 5 is also driven by another hydraulic motor also connected to the engine 12.

The blade housings 13 and 14 are pivotally connected to each other at two pivot joints 52 and 53, as best illustrated in FIG. 7. The pivot joints 52 and 53 are aligned along the longitudinal axis A of the vehicle frame 2 and are located at approximately the same height above the ground as a plane containing the blades 15 and 16 when the mower 1 is resting on level and generally planar ground (see FIG. 3). This ensures that the mower blades 15 and 16 will evenly cut the grass on either side of the vehicle frame 2 regardless of the slope orientation of the terrain over which the mower 1 is transversing.

Each of the pivot joints 52 and 53 comprises a circular bushing 54 connected to the right blade housing 13 and another circular bushing 55 connected to the left blade housing 14. The circular bushings 54 and 55 of the pivot joints 52 and 53 are connected together via a bolt 61 inserted through the center of each bushing 54 and 55 and threaded into an L-shaped terminus 63 of a square post 62.

The posts 62, as are best illustrated in FIG. 3, are attached to the vehicle frame 2 by inserting them through corresponding square sleeves 64 attached to the vehicle frame 2. As shown in FIG. 3, the square rods 62 are vertically adjustable within the sleeves 64 as shown in phantom lines, to provide a central height adjustment for the mower housings 13 and 14. A plurality of vertically spaced bores 59 are provided in the rods 62 with a cotter pin 60 insertable therein to hold the rods 62 in a selected vertical position. Each of the blade housings 13 and 14 can include a rear mounted castering roller 67, as illustrated in FIGS. 4 and 7. FIGS. 5 and 6 are enlarged side and end view illustrations, respectively, of the pivot joint 52 with FIG. 5 illustrating the blade housings 13 and 14 oriented horizontally with respect to each other, and FIG. 6 illustrating the blade housings 13 and 14 being pivoted upward with respect to each other.

The right and left blade housings 13 and 14, respectively, are connected to the right and left side frames 23 and 24 via a mechanical linkage arrangement best illustrated in FIGS. 7 and 10-12. FIG. 7 illustrates the right side connection with the left side connection being a mirror image thereof. In particular, a short linkage arm 65 is pivotally connected to the right side frame 23 on one end and is pivotally connected to a substantially longer linkage arm 66 at the other end. Hinges 75 and 76 respectively pivotally connecting the arm 65 to the frame 23 and the arm 65 to the arm 66, both allowing rotation about parallel axes that are generally vertically aligned when the mower 1 is positioned on a horizontal surface, as seen in FIG. 3. The longer linkage arm 66 is, in turn, connected to the blade housing 13 via an adjustable rod and sleeve attachment best illustrated in FIG. 10. A sleeve 71, shown partially cut away in FIG. 10, is integrally formed in the longer linkage arm 66 with the interior opening of the sleeve running perpendicular to the longitudinal axis of the longer linkage arm 66.

A cylindrical rod 73 is connected to the blade housing 13 via a ball and socket joint 74. The diameter of an inner surface 72 of the sleeve 71 is substantially larger than the outer diameter of the cylindrical rod 73. This permits the rod 73 to freely move up and down relative to the sleeve 71 as well as to move or twist horizontally to some degree relative to the sleeve 71. The hinges 75 and 76 connecting the short and the longer linkage arms 65 and 66 to each other and to the side frame 23 must be extremely rigid due to the relatively long lever arm created between the side frame 23 and the blade housing 13. Thus, these hinges 75 and 76 are relatively large having large diameter pivot pins and are made of hardened steel or the like.

The mechanical linkage arrangement between the side frame 23 and the blade housing 13 acts to eliminate the normal rear support caster wheel and provides an extremely resilient and improved floatation arrangement for the blade housing 13. For example, FIG. 7 illustrates a common situation where a front caster wheel 81 is striking a rock 77 while a side frame wheel 82 remains on level ground. The caster wheel 81 urges the blade housing 13 upward relative to the side frame 23, which would result without the currently discussed improvements in the side frame wheel 82 being forced upward and out of contact with the ground. Due to the linkage arrangement illustrated in FIG. 10, however, the cylindrical rod 73 is forced upward through the sleeve 71 on the linkage arm 66, thus allowing the blade housing 13 to float relative to the side frame 23. This situation is illustrated in FIG. 12, where the rod 73 has traveled upward relative to the sleeve 71 as far as possible.

Furthermore, the greater diameter of the inner surface 72 of the sleeve 71 permits some lateral movement or twisting of the rod 73 relative to the sleeve 71, thus permitting some horizontal as well as vertical float of the blade housing 13, as the side frame 23 swings relative to the vehicle frame 2. This is particularly necessary to prevent binding in the connection between the side frame 23 and the blade housing 13 as the side frame 23 swings due to different radiuses of rotation for these two parts at the location of connection therebetween and because both are connected at laterally and vertically spaced locations to the main frame 2. FIG. 11 illustrates the blade housing 13 returning to its normal horizontal position due to the force of gravity after the caster wheel 81 has left the rock 77 of FIG. 7. Furthermore, the hinges 75 and 76 allow horizontal stability of the blade housing 13 even while the side frame 23 is moved down or up by the hydraulic assembly 32 in response to the leveling system. It is noted that the support frame 23 is positioned to the rear of and spaced from the blade housing 13 and specifically the support frame 23 is connected to the rear of the main frame 2.

Cutting height adjustment of the slope mower 1 is accomplished by adjusting six suspension joints for the blade housings 13 and 4. Each of the front caster wheels 81 has an upright rod 85 connected thereto which engages a sleeve 83 attached to the blade housings 13 and 14. A plurality of adjustment bushings 84 are movable between a position below the sleeve 83 and a position above the sleeve 83, thus raising or lowering the blade housing 13 relative to the caster wheel 81. A cotter pin 86 inserted through a bore 87 near the top of the rod 85 secures the bushings 84 and the sleeve 83 in a selected position.

Adjustment of the mechanical linkage suspension points is best illustrated in FIG. 10. Again, a cotter pin 88 is inserted through one of a series of bores 91 through the cylindrical rod 73, thus selecting the height of the mower deck 13 by controlling the length of the rod 73 which is allowed to extend below the sleeve 71. As stated earlier, a similar arrangement allows the center square support rods 62 to be adjusted relative to the sleeves 64 attached to the vehicle frame 2, as best illustrated in FIG. 3. This height adjustment at all six different suspension locations of the pair of blade housings 13 and 14 permits extremely precise mower blade height adjustment for an even mowing job.

FIGS. 1, 8 and 9 illustrate the shape of the front and rear tires 91 attached to the front and rear wheels 4 and 5 of the vehicle frame 2. The tires 91, as best illustrated in FIG. 8, are turf traction tires having a tread 93 that is generally semi-circular when viewed in lateral cross-section with the point 92 indicating the center associated with the radius of the tread 93 located at approximately the height of the average blade mowing height and having the longitudinal axis A passing therethrough. The tread 93 of the tires 91 gives increased traction to the vehicle frame 2 by placing a greater portion of the tire tread 93 in contact with the ground when the terrain is sloped, as illustrated in FIG. 9. FIG. 9 also illustrates the center point 92 of the circular tire 91 at approximately the height of the average blade mowing height. This is an important improvement that maintains the central sides of the mower housings 13 and 14 at a proper cutting height on slopes. For example, if the blades 15 and 16 are generally set to cut at between two and four inches, the center point 92 would be placed at three inches above the ground. The combination of this placement of the center point 92 and the placement of the blade housing hinges 52 and 53 so as to pivot about the longitudinal axis A and so as to be at approximately the same height as the plane containing the mower blades 15 and 16, ensures that, as the vehicle chassis 2 is rotated relative to the blade housings 13 and 14, the blades 15 and 16 follow the contour of the terrain as closely as possible. This is due to the fact that the two center points 92 stay at the same height above the ground even as the wheels 4 and 5 pivot from side-to-side on hilly or uneven ground and with the axes of rotation of the blade housing pivot joints 52 and 53 in approximate alignment, as illustrated in FIGS. 8 and 9, thus providing a stable center axis for the floating blade housings 13 and 14. This ensures a substantially consistent mowing height as the housings 13 and 14 pivot relative to each other on an uneven slope.

It is to be understood that while certain forms of the present invention have been illustrated and described herein, it is not to be limited to the specific forms or arrangement of parts described and shown.

What is claimed and desired to be securely by Letters Patent is as follows:

1. A mower vehicle for mowing slopes comprising:
   (a) a mower vehicle frame having a generally vertical orientation, when in operation;
   (b) a single front and a single rear wheel, each of said wheels being connected to said vehicle frame, each of said wheels having a tire with a tread which is generally semi-circular in lateral cross-section, along the ground engaging surface thereof; said front and rear wheels being generally aligned such that said vehicle frame is pivotal relative to the ground about a longitudinal axis passing through a center associated with a radius of the tire treads;
   (c) a prime mover mounted on said main frame and connected to at least one of said front and rear wheels to propel said mower vehicle across the ground; and
   (d) a side frame pivotally connected to said vehicle frame and being swingable substantially about said axis extending longitudinal along said side frame; said side frame extending in at least one lateral direction from said longitudinal axis; and said side frame having cutting means mounted thereon.

2. The mower vehicle of claim 1, further comprising:
   (a) said side frame having a ground engageable outrigger wheel laterally spaced from said vehicle frame;
   (b) a mower housing pivotally attached to and extending from said vehicle frame so as to be swingable about said longitudinal axis and including said cutting means mounted therein; said mower housing being attached to said side frame by floatable connection means; and
   (c) pivoting means for pivoting said side frame about said longitudinal axis in automatic response to a change in terrain as said vehicle traverses the terrain, thereby allowing said side frame to follow the terrain while said vehicle frame pivots about the terrain on said front and rear wheels and remains in a generally vertical orientation thereby allowing said mower housing to follow the terrain directly below said mower housing generally independent of said side frame and said vehicle frame.

3. The mower vehicle according to claim 2, wherein:
   (a) said side frame is a first side frame and said mower housing is a first mower housing; and including:
   (b) a second side frame being pivotally connected to said vehicle frame on an opposite of said vehicle frame relative to said first side frame; said second side frame being swingable about an axis extending longitudinally of said vehicle frame; said second side frame extending laterally from said longitudinal axis and having an associated ground engageable outrigger wheel laterally spaced from said vehicle frame; and
   (c) said second mower housing including cutting means and being attached to said second side frame via a floatable connection.

4. The mower vehicle according to claim 3, including:
 (a) pivot means connecting said first and second mower housings so that they are pivotal relative to each other; said pivot means including at least one hinge being located at approximately the same height as a plane containing the cutting means and said longitudinal axis passing through said hinge.

5. The mower vehicle according to claim 4, wherein:
 (a) said pivot means includes two hinges, one in front of and one to the rear of said mower housings; both said hinges being located at approximately the same height as a plane containing the cutting means; and
 (b) both of said hinges are connected to said main frame along said longitudinal axis thereof.

6. The mower vehicle according to claim 5, wherein:
 (a) the lowest of said centers associated with the radius of said tire treads are located at approximately the height of the average cutting means mowing height.

7. A mower vehicle for mowing slopes, comprising:
 (a) a mower vehicle frame having a generally vertical orientation when in operation;
 (b) a single front wheel and a single rear wheel, each of said wheels being connected to said vehicle frame and being generally aligned such that said vehicle frame is pivotal relative to the ground about a longitudinal axis passing through said front and rear wheels;
 (c) a prime mover mounted on said vehicle frame and being connected to at least one of said front and rear wheels for propelling said mower vehicle across the ground;
 (d) a side frame pivotally connected near the rear of said vehicle frame and being swingable on said vehicle frame; said side frame extending laterally from said vehicle frame and having a ground engageable outrigger wheel laterally spaced from said vehicle frame;
 (e) a mower housing pivotally attached to and extending outwardly from said vehicle frame so as to be swingable about said longitudinal axis and including cutting means mounted therein; said mower housing being connected to said side frame by floatable connection means;
 (f) said side frame including a hinged linkage extending forward of said outrigger wheel; said linkage comprising a first linkage arm pivotally connected at a first end to said outrigger wheel and a second linkage arm pivotally connected at a first end to a second end of said first linkage arm; a second end of said second linkage arm having a vertically oriented sleeve attached thereto;
 (g) said mower housing including a rod attached thereto by joint means; and
 (h) said sleeve having an inner surface having a diameter that is substantially larger than the outer diameter of said rod; said rod extending through said sleeve to form said floatable connection means.

8. The mower vehicle according to claim 7, wherein:
 (a) said mower housing has a single ground engaging caster wheel attached to a front end thereof.

9. The mower vehicle according to claim 8, wherein:
 (a) said rod is vertically adjustable relative to said sleeve and said mower housing is vertically adjustable relative to said caster wheel to provide height adjustment of said cutting means.

10. The mower vehicle according to claim 7, wherein:
 (a) said side frame is a first side frame and said mower housing is a first mower housing; and including:
 (b) a second side frame being pivotally connected near the rear of said vehicle frame on an opposite side relative to said first side frame; said second side frame being swingable about said axis; said second side frame extending laterally from said longitudinal axis and having an associated ground engageable outrigger wheel laterally spaced from said vehicle frame; and
 (c) said second mower housing includes cutting means; said second mower housing being attached to said second side frame by second floatable connection means.

11. The mower vehicle according to claim 10, including:
 (a) pivot means connecting said first and second mower housings so that said housings are pivotal relative to each other.

12. The mower vehicle according to claim 11, wherein:
 (a) said pivot means includes two hinges, one in front of and one to the rear of said mower housings; and
 (b) said hinges are connected to said vehicle frame to pivot along said longitudinal axis.

13. The mower vehicle according to claim 12, wherein:
 (a) each said side frame includes a hinged linkage extending forward of said outrigger wheel; each said linkage comprising a first linkage arm pivotally connected at a first end to said outrigger wheel and a second linkage arm pivotally connected at a first end to a second end of said first linkage arm; a second end of said second linkage arm having a vertically oriented sleeve attached thereto;
 (b) each said mower housing includes a rod attached thereto by second joint means;
 (c) each of said sleeves has an inner surface having a diameter which is substantially larger than the outer diameter of the corresponding rod; each said rod extending through the corresponding sleeve to form said floatable connection means.

14. The mower vehicle according to claim 13, wherein:
 (a) each of said rods is vertically adjustable relative to a respective sleeve to form first and second adjustment joints, each of said mower housings is vertically adjustable relative to said caster wheel to form third and fourth adjustment joints and each of said hinges is vertically adjustable relative to said main frame to form fifth and sixth adjustment joints; whereby
 (b) said cutting means is vertically adjustable by manipulation of each of said six adjustment joints.

15. The mower vehicle according to claim 12, wherein:
 (a) each of said hinges is located at approximately the same height as a plane containing the cutting means.

16. The mower vehicle according to claim 15, wherein:
 (a) said front and rear wheels each include a tire with a tread which is generally semi-circular in lateral cross-section; and (b) said longitudinal axis passes through a center associated with a radius of the semi-circular cross-section of the lowest part of the tread.

17. The mower vehicle according to claim 26, wherein:
   (a) said centers of each of said tires are located at approximately the height of the average cutting means mowing height.

18. A mower vehicle for mowing slopes comprising:
   (a) a mower vehicle frame having a generally vertical orientation, when in operation;
   (b) a single front and a single rear wheel, each of said wheels being connected to said vehicle frame, each said wheel having a tire with an outer tread that is generally semi-circular in lateral cross-section, said front and rear wheels being generally aligned such that said vehicle frame is pivotal relative to the ground about a longitudinal axis passing through a center of the radii associated with the lowest cross-section part of the tread of each of said tires;
   (c) a prime mover mounted on said main frame and connected to at least one of said front and rear wheels to propel said mower vehicle across the ground;
   (d) a pair of side frames pivotally connected on opposite sides of said vehicle frame near the rear thereof and swingable about said vehicle frame; each of said side frames extending laterally from said vehicle frame and having a ground engageable outrigger wheel laterally spaced from said vehicle frame;
   (e) a pair of mower housings pivotally attached to and extending from said vehicle frame so as to be generally swingable about said longitudinal axis and including cutting means mounted therein; each said mower housing being attached to a corresponding side frame by floatable connection means;
   (f) pivoting means for pivoting each of said side frames about said vehicle frame in automatic response to a change in terrain as said vehicle traverses the terrain, thereby allowing said side frames to follow the terrain while said vehicle frame pivots about the terrain on said front and rear wheels and remains in a generally vertical orientation thereby allowing said mower housings to follow the terrain directly below said mower housings generally independent of said side frame and said vehicle frame;
   g) pivot means connecting said mower housings so that said housings are pivotal relative to each other, said pivot means including two hinges, one in front of and one to the rear of said mower housings; both of said hinges being located at approximately the same height as a plane containing the cutting means, said hinges being connected to said main frame so as to allow pivoting along said longitudinal axis;
   (h) said centers of said tire treads being located at approximately the height of the average cutting means mowing height;
   (i) each of said side frames including a hinged linkage extending forward of said outrigger wheel; each said linkage comprising a first linkage arm pivotally connected at a first end to said outrigger wheel and a second linkage arm pivotally connected at a first end to a second end of said first linkage arm; a second end of said second linkage arm having a vertically oriented sleeve attached thereto;
   (j) each said mower housing including a rod attached thereto by joint means; and
   (k) each of said sleeves having an inner surface having a diameter that is substantially larger than the outer diameter of said rod; each of said rods extending through a respective one of said sleeves to form said floatable connection means.

19. The mower vehicle according to claim 18, wherein:
   (a) each of said mower housings has a single ground engaging caster wheel attached to a front side thereof; and
   (b) each of said rods is vertically adjustable relative to a respective sleeve, each of said mower housings is vertically adjustable relative to said caster wheel and each of said hinges is vertically adjustable relative to said vehicle frame; whereby
   (c) height adjustment of said cutting means is adjustable by manipulation of six associated joints.

20. A mower vehicle for mowing slopes comprising:
   (a) a mower vehicle frame having a generally vertical orientation, when in operation;
   (b) a single front and a single rear wheel, each of said wheels being connected to said vehicle frame, each of said wheels having a tire with a tread which is generally semi-circular in lateral cross-section, said front and rear wheels being generally aligned such that said vehicle frame is pivotal relative to the ground about a longitudinal axis passing through a center associated with a radius of the tire treads vertically spaced above the lowermost part of each of said tires;
   (c) a prime mover mounted on said main frame and connected to at least one of said front and rear wheels to propel said mower vehicle across the ground;
   (d) a side frame pivotally connected to said vehicle frame near the rear thereof and swingable about an axis extending longitudinally of said vehicle frame; said side frame extending laterally from said longitudinal axis and having a ground engageable outrigger wheel laterally spaced from said vehicle frame;
   (e) a mower housing pivotally attached to and extending from said vehicle frame so as to be swingable about said longitudinal axis and including cutting means mounted therein; said mower housing being attached to said side frame by floatable connection means;
   (f) pivoting means for pivoting said side frame about said longitudinal axis in automatic response to a change in terrain as said vehicle traverse the terrain, thereby allowing said side frame to follow the terrain while said vehicle frame pivots about the terrain on said front and rear wheels and remains in a generally vertical orientation thereby allowing said mower housing to follow the terrain directly below said mower housing generally independent of said side frame and said vehicle frame;
   (g) said side frame includes a hinged linkage extending forward of said outrigger wheel; and linkage comprising a first linkage arm pivotally connected to a first end to said outrigger wheel and a second linkage arm pivotally connected at a first end to a second end of said first linkage arm; a second end of said second linkage arm having a vertically oriented sleeve attached thereto;

(h) said mower housing includes a rod attached thereto by a ball and socket joint; and (i) said sleeve has an inner surface having a diameter that is substantially larger than the outer diameter of said rod; said rod extending through said sleeve to form said floatable connection means.

21. The mower vehicle according to claim 20, wherein:

(a) said mower housing has a single ground engaging caster wheel attached to a front side thereof.

22. The mower vehicle according to claim 21, wherein:

(a) said rod is vertically adjustable relative to said sleeve and said mower housing is vertically adjustable relative to said caster wheel to provide height adjustment of said cutting means.

23. A mower vehicle for mowing slopes comprising:

(a) a mower vehicle frame having a generally vertical orientation, when in operation;

(b) a single front and a single rear wheel, each of said wheels being connected to said vehicle frame, each of said wheels having a tire with a tread which is generally semi-circular in lateral cross-section, said front and rear wheels being generally aligned such that said vehicle frame is pivotal relative to the ground about a longitudinal axis passing through a center associated with a radius of the tire treads vertically spaced above the lowermost part of each of said tires;

(c) a prime mover mounted on said main frame and connected to at least one of said front and rear wheels to propel said mower vehicle across the ground;

(d) a first side frame pivotally connected to said vehicle frame near the rear thereof and swingable about an axis extending longitudinally of said vehicle frame; said first side frame extending laterally from said longitudinal axis and having a ground engageable outrigger wheel laterally spaced from said vehicle frame;

(e) a first mower housing pivotally attached to and extending from said vehicle frame so as to be swingable about said longitudinal axis and including cutting means mounted therein; said first mower housing being attached to said side frame by floatable connection means;

(f) pivoting means for pivoting said first side frame about said longitudinal axis in automatic response to a change in terrain as said vehicle traverses the terrain, thereby allowing said side frame to follow the terrain while said vehicle frame pivots about the terrain on said front and rear wheels and remains in a generally vertical orientation thereby allowing said first mower housing to follow the terrain directly below said first mower housing generally independent of said first side frame and said vehicle frame;

(g) a second side frame being pivotally connected to said vehicle frame on an opposite of said vehicle frame relative to said first side frame; said second side frame being swingable about an axis extending longitudinally of said vehicle frame; said second side frame extending laterally from said longitudinal axis and having an associated ground engageable outrigger wheel laterally spaced from said vehicle frame;

(h) said second mower housing including cutting means and being attached to said second side frame via a floatable connection;

(i) pivot means connecting said first and second mower housings so that they are pivotal relative to each other; said pivot means including at least one hinge being located at approximately the same height as a plane containing the cutting means and said longitudinal axis passing through said hinge;

(j) said pivot means includes two hinges, one in front of and one to the rear of said mower housings; both said hinges being located at approximately the same height as a plane containing the cutting means;

(k) both of said hinges are connected to said main frame along said longitudinal axis thereof;

(l) each of said side frames includes a hinged linkage extending forward of said outrigger wheel; each of said linkages comprises a first linkage arm pivotally connected at a first end to said outrigger wheel and a second linkage arm pivotally connected at a first end to a second end of said first linkage arm; a second end of said second linkage arm has a vertically oriented sleeve attached thereto;

(m) each said mower housing includes a rod attached thereto by a ball and socket joint; and (n) each said sleeve has an inner surface having a diameter that is substantially larger than the outer diameter of said rod; each said rod extends through said sleeve to form said floatable connection means.

24. The mower vehicle according to claim 23, wherein:

(a) each said mower housing has a single ground engaging caster wheel attached to a front side thereof.

25. The mower vehicle according to claim 24, wherein:

(a) each said rod is vertically adjustable relative to a respective sleeve, each of said mower housings is vertically adjustable relative to said caster wheel and each of said hinges is vertically adjustable relative to said vehicle frame;

(b) whereby height adjustment of said cutting means is fully adjustable by variation of only six different adjustment joints.

* * * * *